May 4, 1965
G. N. BAUSTIAN
3,181,794
CONDENSATE DISCHARGE BOOSTER
Filed Sept. 24, 1962
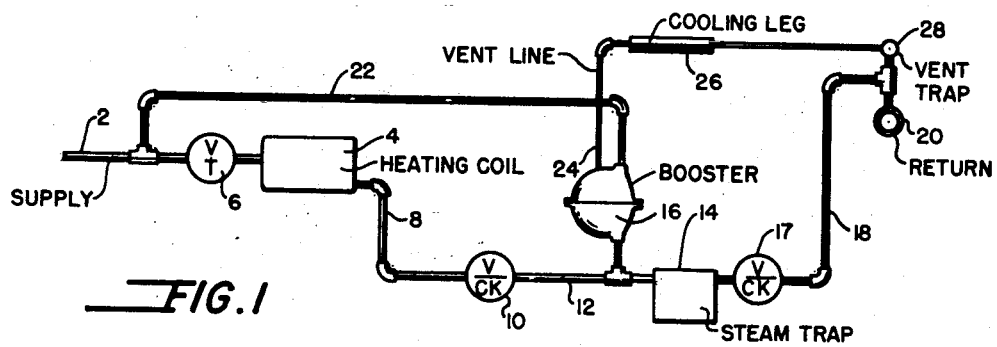
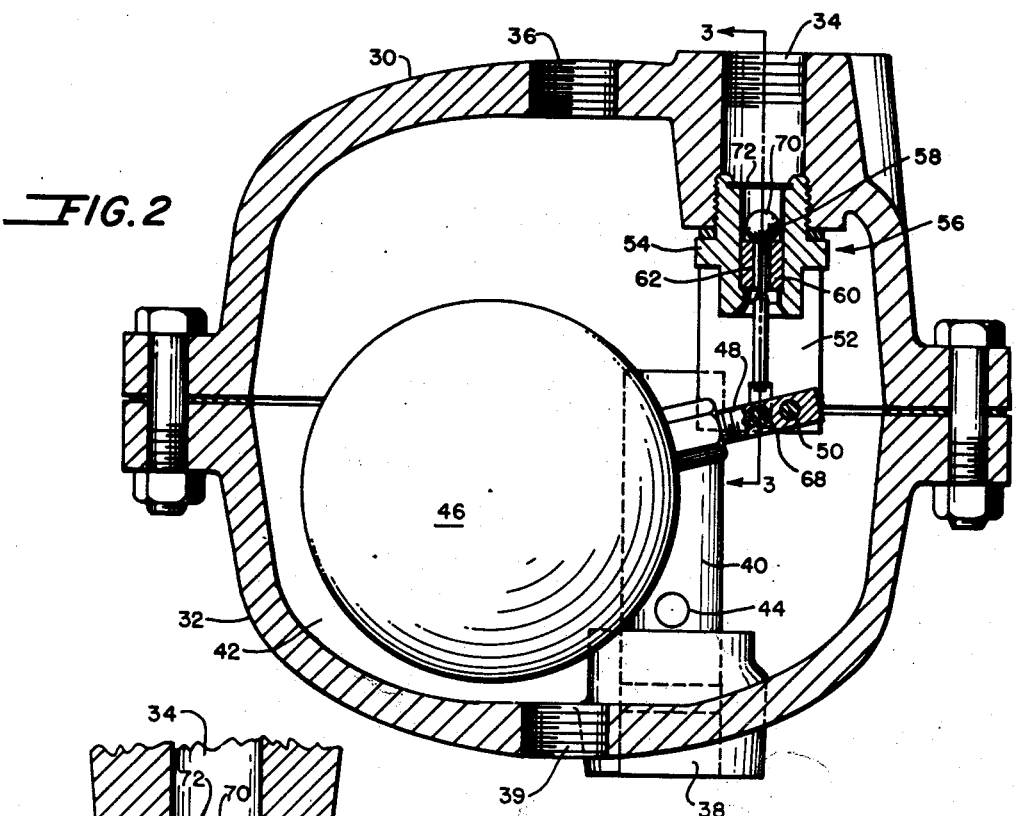
INVENTOR.
GORDON N. BAUSTIAN
BY
Edward C. Greay
ATTORNEY

United States Patent Office 3,181,794
Patented May 4, 1965

3,181,794
CONDENSATE DISCHARGE BOOSTER
Gordon N. Baustian, Bettendorf, Iowa, assignor to American Air Filter Company, Inc., Louisville, Ky., a corporation of Delaware
Filed Sept. 24, 1962, Ser. No. 225,506
3 Claims. (Cl. 237—67)

This invention relates generally to steam systems and in particular to apparatus for supplying steam under sufficient pressure to a steam trap or other condensate accumulating device for forcing condensate therefrom into a condensate return line.

The invention is applicable for use in any steam system where a condition exists in which there may be inadequate steam pressure, from time to time, to effect discharge of condensate from a trap, or a like device in which condensate may accumulate, to a condensate return line. Such a system may be one, for example, where a low pressure coil is used in a high pressure system, and the return line pressure into which the steam trap on the outlet of the coil discharges is greater than the pressure to the low pressure coil. Or it may be one where it is desirable to lift condensate from a trap to a return line, but the coil is provided with a valve which is throttled from time to time so that pressure intended to effect discharge of condensate from the trap to the return line is inadequate to lift the condensate the required degree. Apparatus according to the invention may also be used under conditions where a conventional lift trap would normally be used.

For purposes of description, the invention will be described in an environment wherein there is a steam coil subject to be throttled, and the return main into which the condensate from the coil trap must be discharged is elevated with respect to the coil and trap to a degree that the steam pressure to the coil in a throttled condition is insufficient to force the condensate upwardly into the return line. In this environment, the condensate booster of the invention is connected to receive steam from upstream of the throttling valve for the coil, and is also connected to a point in the return line which connects the coil outlet to the steam trap. The condensate booster includes: a float chamber and a separate condensate inlet-outlet chamber or passage which are in restricted communication with each other through aperture means in the bottom portion of the wall separating the two chambers; a steam inlet; and a float in the float chamber controlling a valve for the steam inlet in accordance with the level of condensate in the float chamber. The upper end of the condensate inlet-outlet chamber is in open communication with the space in the booster into which steam is received through the steam inlet, and its lower end is connected to receive condensate from the line leading to the steam trap inlet. When the valve opens, due to a rise in condensate in the float chamber, it admits steam under pressure from upstream of the throttling valve, and this pressure forces the accumulated condensate through the inlet-outlet passage, from the return line leading to the trap, and from the trap up to the return main. As this occurs, condensate flows by gravity from the float chamber into the inlet-outlet passage at a restricted rate through the aperture means in the wall separating the two chambers. If substantially all the condensate is discharged from the return line and the trap before the booster inlet valve closes, the trap will itself prevent the flow of steam into the return line which leads to the return main. Conversely, if the booster inlet valve closes first, then there will be some condensate remaining in the trap, and perhaps in the return line between the coil and the trap, and this condensate is then discharged during the next cycle of the booster device. Of course, if at any time the throttled valve admitting steam to the coil is opened sufficiently, the increased steam pressure will force any accumulated condensate through the trap. Under such a condition the booster device becomes inactive.

Since the booster device need accumulate only a small part of the total condensate which may accumulate, the booster device may be relatively small, and consequently relatively inexpensive. Further, since in the just described environment, it operates only during periods when the coil valve is throttled, the life of the certain operating parts in the booster device is accordingly lengthened. Additionally, since the valve in the steam trap will normally close first in response to steam being admitted to it, as distinguished from the booster valve first closing, it is not mandatory that the booster inlet valve be of the snap-acting type with the attendant complexities therein involved.

One embodiment incorporating the principles of the invention will be described in connection with the accompanying drawing wherein:

FIGURE 1 is a diagrammatic view of a portion of one steam system arrangement in which the invention is incorporated;

FIGURE 2 is a vertical sectional view of the condensate booster; and

FIGURE 3 is a fragmentary vertical sectional view corresponding to one taken along the line 3—3 of FIGURE 2.

Referring to FIGURE 1, a line 2 is connected to supply steam to the heating coil 4 through throttling valve 6. The outlet of the coil is connected through drip leg 8, check valve 10, and return line 12 to the inlet of a steam trap 14. Line 12 is also connected to an opening in the bottom wall of condensate booster 16. Trap 14, which may be, for example, a conventional bucket trap of one kind or another, has its outlet connected through check valve 17 to a lift line 18 which leads to a return main 20. When the throttle valve 6 is sufficiently open, the pressure of entering steam will be sufficient to force accumulated condensate in the return line 12 and in the trap through the trap and up the lift line 18 to the return main 20. However, if the valve 6 is throttled to a degree that the pressure is inadequate to lift the condensate up the lift line 18, the condensate will remain in line 12, trap 14, and line 18 even though the trap is in a condition to permit discharge of the condensate.

Under such a throttle valve condition, the booster device 16 will come into operation. A steam inlet in the top wall of the booster is connected by line 22 to steam supply line 2 upstream of the throttle valve 6. A vent opening in the top wall of the booster is connected through vent line 24, cooling leg 26 and vent trap 28 to the return main 20. The cooling leg serves to accelerate the collapse of any steam left in the booster after its steam inlet closes. Before passing to the description of the booster details, it is noted that the booster is shown in substantially enlarged form, relative to the coil, trap, and certain other components, in FIGURE 1. In fact, the booster may be relatively small compared to the trap since its function is in effect a pilot control function, and it need have only sufficient capacity for holding condensate to carry out this function.

The booster casing includes top and bottom flanged shells 30 and 32 (FIGURE 2) secured together with a gasket between the flanges. The top half of the casing includes tapped opening 34 which receives the end of pressure line 22, and tapped opening 36 which receives the end of vent line 24. The opening 38 in the fitting disposed in the bottom wall of the lower half 32 receives the pipe which connects to the return line 12 of FIGURE 1. The tapped opening 39 in the bottom wall is for a drain plug.

An open-ended tube 40 projects upwardly from the opening 38 and serves as the partition means dividing the lower part of the casing interior into the condensate inlet-outlet passage corresponding to the space within the tube, and a separate float chamber 42 corresponding to the lower interior of the vessel exteriorly of the tube. Tube 40 includes one or more apertures 44 near its lower end for the purpose of placing the discharge passage and float chamber in restricted communication with respect to the flow of condensate. When condensate flows upwardly into the booster device through opening 39, it passes through aperture 44 into the float chamber until the level of condensate in the float chamber builds up to the level of the aperture, thereafter the level of condensate in both the float chamber and inlet-outlet passage will be equal as this level rises due to additional condensate flowing into the booster.

The float 46 is free to rise and fall with the changing level of condensate in the float chamber, and is attached to control actuation of the steam inlet valve through means now to be described. The float is attached to one end of lever arm 48 which is pivotably secured near its other end by pin 50. The ends of pin 50 are journalled in the opposite legs of the downwardly open U-shaped bracket 52. The bracket 52 is in turn held in place against the bottom end of the structure defining opening 34 by the shoulder 54 of valve retainer 56 which is turned into the interiorly threaded bottom end of the opening 34.

The retainer 56 has a central bore 58 into which is press fitted the cylindrical member 60 having a central passage 62 which loosely receives the upper end of rod 64. The upper end of the central passage 62 serves as a valve seat. The bottom end of rod 64 is pivotably attached to the float lever arm 48 at a location between pivot pin 50 and the float 46 through a downwardly open U-shaped leaf spring 66 which straddles the lever and has its downwardly extending arms secured to the projecting ends of a pin 68 carried by the lever arm 48 in parallel relation to the pivot pin 50.

A sealing ball 70 seats upon the upper end of the passage 62 forming the valve seat. The ball is confined within the upper end of the retainer bore by a perforated disk 72 overlying the ball and secured along its periphery to the retainer. The leaf spring 66 serves to pop the ball 70 off its seat and open the passage 62 in a positive fashion.

It will be appreciated from the foregoing description that when the level of condensate in the float chamber 42 and the inlet-outlet passage 40 is below a certain level, the ball 70 will be seated due to the steam pressure in line 22 connected upstream of the throttling valve 6 of FIGURE 1. Then if the throttle valve 6 of FIGURE 1 is throttled beyond a certain point, the condensate which accumulates in the steam trap 14, return line 12, and lift line 18 will be unable to flow to the return main 20 and will rise into the booster device through opening 38. As the condensate rises in the discharge tube 40, it will normally flow through the aperture 44 into the float chamber 42. If the rate at which condensate enters the booster exceeds the capacity of the aperture 44, the condensate will flow out of the top of the tube 40 into the float chamber. The float 46 will rise with a rising level of condensate and will thereby force rod 64 upwardly as the lever arm 48 correspondingly pivots about pin 50. When the rising rod 64 unseats the ball 70 from its seat, high pressure steam will be admitted into the vessel and will force the condensate in the discharge tube 40 downwardly into line 12 and through trap 14 up to the return main 20. The check valve 10 prevents the reverse flow of condensate from line 12 back into the coil 4. While this is occuring, the level of condensate in the float chamber 42 is dropping at a relatively slow rate in accordance with the flow of condensate through aperture 44 by gravity. When the level of condensate in the float chamber 42 drops sufficiently that the ball 70 can reseat, admission of steam into the booster interior is terminated.

It will be appreciated that the closing of the steam inlet valve to the booster is independent of the clearing of condensate from the return line 12 and steam trap 14 since the seating of the steam inlet valve is determined solely in accordance with the drop of the condensate level in the float chamber 42. Thus, after the condensate has been cleared from line 12 and trap 14, the trap will close in response to the admission of steam if the steam inlet valve to the booster is still open, and the inlet valve to the booster will then close when the condensate level in the float chamber drops sufficiently. Of course, if the steam inlet valve to the booster should close before all of the condensate is discharged from the trap, a subsequent rise in level of condensate in the float chamber 42 will again open the steam inlet to initiate another cycle of discharge of the condensate.

While the separation of the lower part of the booster into an inlet-outlet passage and a float chamber is accomplished in the described example by employing the tube 40, the partition means could, as an alternative example, take the form of a straight wall extending across the booster device with an aperture in the lower part of the wall. It is only necessary that the inlet-outlet passage be in open communication with the space into which the steam is admitted into the booster body and that the inlet-outlet passage and float chamber be in relatively restricted communication with respect to the flow of condensate therebetween.

As shown in FIGURE 1, the booster device should be installed so that a condensate level in the booster effecting opening of the steam inlet below the outlet of the heating coil or other steam condensing apparatus.

I claim:

1. The combination of:
   (a) a condensate accumulating device which is subject at times to accumulating condensate under a pressure condition inadequate to effect the discharge of said accumulated condensate;
   (b) a condensate discharge booster device for supplementing the discharge of condensate from said condensate accumulating device comprising,
      (1) a casing,
      (2) partition means dividing the lower part of said casing into a float chamber and a condensate inlet-outlet chamber, said partition means including aperture means in the lower part thereof placing said chambers in restricted communication with each other therethrough,
      (3) a steam inlet in said casing,
      (4) valve means for said steam inlet, and
      (5) float means in said float chamber connected to control said valve means to admit steam in accordance with the level of condensate in said float chamber;
   (c) means connecting said casing steam inlet to a source of steam under a pressure adequate to effect the discharge of condensate from said accumulating device; and,
   (d) means connecting said condensate inlet-outlet chamber to said accumulating device.

2. The combination of:
   (a) a steam coil subject to being throttled at times;
   (b) a steam trap connected to receive condensate from said coil;
   (c) a condensate discharge booster device for supplementing the discharge of said steam trap, comprising,
      (1) an enclosed casing divided by partition means in its lower portion into a float chamber and a condensate inlet-outlet chamber in restricted communication with each other through aperture means in the lower part of said partition means,
(2) a steam inlet in open communication with the upper end of said inlet-outlet chamber,
(3) a valve for said steam inlet, and
(4) float means in said float chamber connected to said valve to control the admission of steam through said inlet in accordance with the level of condensate in said float chamber;
(d) means connecting said casing steam inlet to a source of steam under a pressure adequate to effect the discharge of said condensate from said steam trap; and,
(e) means connecting the lower end of said inlet-outlet chamber to the inlet of said steam trap.

3. The combination of claim 2 wherein:
(a) said aperture means is sized, relative to the open area of said inlet-outlet chamber, to restrict the flow of condensate from said float chamber into said inlet-outlet chamber when said steam inlet is open to a rate substantially below the rate at which condensate flows out of said inlet-outlet chamber to said steam trap.

References Cited by the Examiner
UNITED STATES PATENTS

| | | | |
|---|---|---|---|
| 265,542 | 10/82 | Salisbury | 137—428 X |
| 277,170 | 3/42 | Temple | 137—415 X |
| 2,293,867 | 8/42 | Temple | 137—195 |
| 3,002,522 | 10/61 | Klinefelter | 137—202 |

EDWARD J. MICHAEL, *Primary Examiner.*

ISADOR WEIL, *Examiner.*